C. D. McCOLLOUGH.
CORE FOR RESILIENT TIRES.
APPLICATION FILED JAN. 31, 1920.
1,362,714. Patented Dec. 21, 1920.
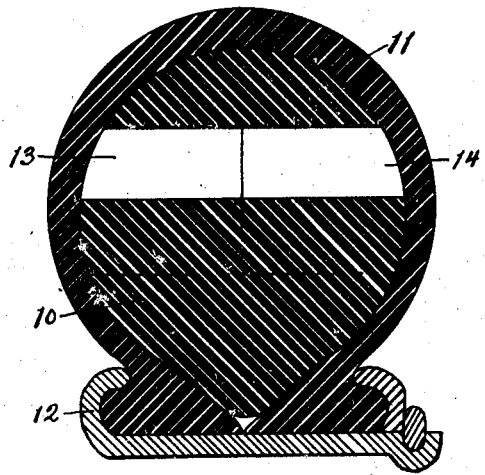
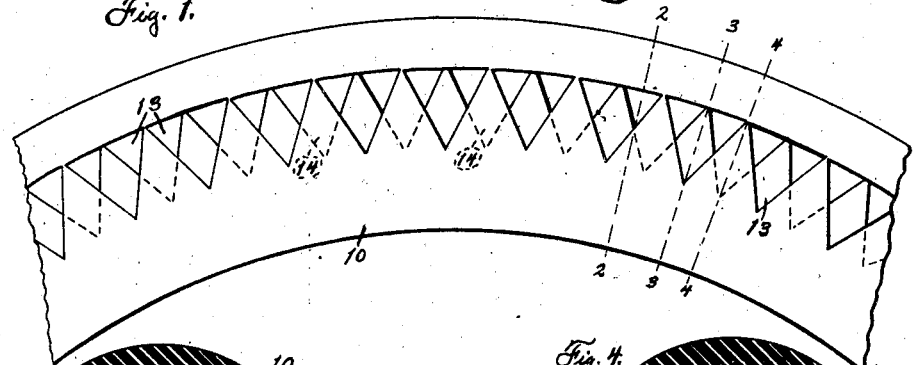
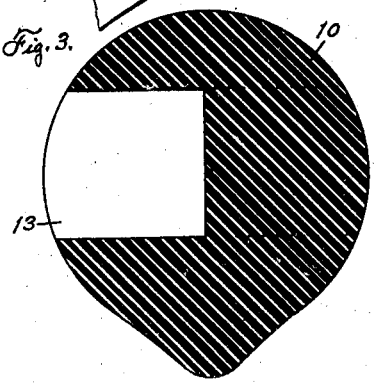
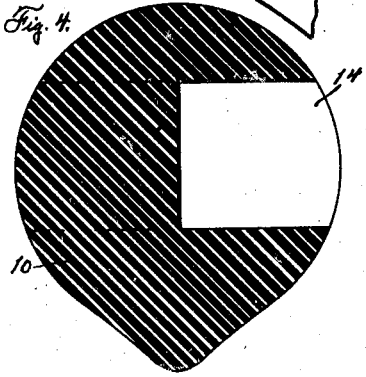
INVENTOR:
C. D. McCOLLOUGH

UNITED STATES PATENT OFFICE.

CHARLES D. McCOLLOUGH, OF DES MOINES, IOWA.

CORE FOR RESILIENT TIRES.

1,362,714.  Specification of Letters Patent.  Patented Dec. 21, 1920.

Application filed January 31, 1920. Serial No. 355,448.

*To all whom it may concern:*

Be it known that I, CHARLES D. McCOLLOUGH, a citizen of the United States of America, and resident of Des Moines, Polk county, Iowa, have invented a new and useful Core for Resilient Tires, of which the following is a specification.

The object of this invention is to provide an improved resilient and elastic core for tires of vehicle wheels.

A further object of this invention is to provide an improved molded core for resilient tires, which core is formed with a substantially uniform displacement of its material content throughout its circumference, whereby practically uniform resilience and compressibility are produced circumferentially of the core.

A further object of this invention is to provide an improved core for resilient tires, which core is formed with apertures on its lateral sides to increase its resilience, said apertures communicating circumferentially to permit circumferential displacement of air therein during travel of the tire in which the core is mounted.

My invention consists in the construction, arrangement and combination of elements hereinafter set forth, pointed out in my claims and illustrated by the accompanying drawing, in which—

Figure 1 is a side elevation illustrating a segment of a core embodying my invention. Fig. 2 is a cross-section on the line 2—2 of Fig. 1, the core being shown in a casing mounted on a wheel rim as required for practical use. Figs. 3 and 4 are cross-sections on the lines 3—3 and 4—4 respectively of Fig. 1. Figs, 2, 3 and 4 are on a scale enlarged relative to Fig. 1.

In the construction of the device as shown the numeral 10 designates the core body, which preferably is molded, in annular form and of homogeneous character, from a single material such as rubber or other suitable material having greater or less inherent resilient properties. The homogeneous cores such as 10 may be made of any suitable dimensions adapting them to be used in ordinary casings, such as 11, separately formed and finished of rubber, or rubber and fabric, or other material and adapted to be used on wheel rims such as 12 of any approved construction. The core 10 is formed with a series or annular row of apertures 13 on one of its lateral sides and with a similar row of apertures 14 on the other of its lateral sides. The apertures 13, 14 are of uniform size and dimension and preferably each is, in cross-section, the shape of an equilateral or other isosceles triangle having its base arranged toward and falling in an arc concentric with and of less radius than the outer circumference of the annulus of the core and one of its apices directed toward and falling within an arc concentric with and of greater radius than the center of said annulus. Each of the apertures 13, 14 extends from a lateral surface of the core 10 to the median line thereof, wholly falls within the annular space between the two intermediate arcs above noted, and the apertures 13 are staggered relative to the apertures 14. The apertures in each row may be spaced apart suitable distances at their outer margins if desired but I prefer to arrange them substantially in contact as shown in Fig. 1; that is the angle at the base of one aperture, adjacent the outer circumference of the annulus of the core, is very near to the adjacent angle of the next aperture in the row, whereby adjacent apertures in each row are separated at their radially outer margins by thin walls only of the material of the core. In this manner the apertures 13 of one row, or on one side of the core, overlap the apertures 14 of the other row, and communicate therewith, an aperture 13 communicating, throughout substantially one-quarter of its cross-sectional area, with each of two adjacent apertures 14. Thus spaced apertures are formed which extend entirely through and transversely of the core 10, as clearly shown in Fig. 2, each of such apertures being, in cross-section, the shape of an isosceles triangle and having a cross-sectional area equal to substantially one-quarter that of either of the apertures 13 or 14.

The apertures thus formed in the core increase the compressibility of the core and the resilience of the core and tire. It is apparent that the size and spacing of the apertures may be varied in accordance with the degree of resilience desired to be obtained, and the weights to be borne; but the apertures on each side should always be staggered and should overlap to provide communication between adjacent and successive apertures.

When the apertures are arranged close together and as shown and described, it is apparent that the displacement of rubber content of the core is substantially uniform at all points throughout the circumference thereof, thus assuring substantially uniform resilience circumferentially and obviating objectionable bumping effect in use of the core in a tire. It is also apparent that by reason of the overlapping of the apertures and their staggered relation a sinuous continuous channel or open space is provided circumferentially of the core when inclosed in a casing; that is, one aperture 13 communicates with an opposite aperture 14 of the other row, which in turn communicates with the next succeeding aperture 13 of the first row. Thus displacement of air in the apertures is permitted circumferentially of the core as it travels under pressure of a load, which further increases the resilience and uniform compressibility of the whole tire.

I claim as my invention—

1. A core for resilient tires, comprising an annular homogeneous core body formed with two series of apertures extending from its opposite lateral sides to its median line, each of said apertures being of uniform cross-sectional area from the lateral side of the core body to the median line thereof, the apertures on one side being staggered relative to the apertures on the opposite side, all of said apertures falling wholly within an annular space defined by circles between and concentric with the radially outer and inner circumferences of the core.

2. A core for resilient tires, comprising an annular homogeneous core body formed of a selected resilient material with apertures extending from its lateral sides to its median line, each of said apertures being of uniform cross-sectional area from the lateral side of the core body to the median line thereof, the apertures on one side being staggered relative to but overlapping the apertures on the opposite side, whereby apertures of smaller cross-sectional area are formed extending entirely through the core body, all of said apertures falling wholly within an annular space defined by circles between and concentric with the radially outer and inner circumferences of the core.

3. A resilient core adapted to be used with a tire casing of common form which is separately built and vulcanized, which core comprises an annular homogeneous core body formed from a single selected substance by molding, said core body being formed with apertures extending from its lateral sides to its median line, each of said apertures falling entirely within an annular space defined by circles between and concentric with the radially inner and outer circumferences of the core.

4. A resilient core adapted to be used with a tire casing of common form which is separately built and vulcanized, which core comprises an annular homogeneous core body formed from a single selected substance by molding, said core body being formed with apertures extending from its lateral sides to its median line, each of said apertures falling entirely within an annular space defined by circles between and concentric with the radially inner and outer circumferences of the core, said core presenting an imperforate inner surface to the noses of the beads and presenting an imperforate tread surface free from and adapted for circumferential movement relative to the inner surface of the tread portion of said casing.

5. A core for resilient tires, comprising an annular core body formed with two series only of apertures extending from its lateral sides to its median line, each of said apertures being of substantially equilaterally triangular form in cross-section, all of said apertures being of uniform size, all of said apertures falling wholly within an annular space defined by circles between and concentric with the radially outer and inner circumferences of the core body.

6. A core for resilient tires, comprising an annular homogeneous core body formed with two series only of apertures extending from its lateral sides to its median line, said apertures being arranged substantially midway between the inner and outer circumferences of said annular core body and spaced from each of said circumferences, said apertures also being substantially equilaterally triangular in cross section, the apertures of each series being substantially contiguous successively circumferentially of the core body and being staggered relative to the apertures of the other series, whereby substantially uniform displacement of content of the core body is secured circumferentially and uniform resilience is obtained, all of said apertures falling wholly within an annular space defined by circles between and concentric with the radially outer and inner circumferences of the core body.

Signed at Des Moines, in the county of Polk and State of Iowa, this 27th day of January, 1920.

CHARLES D. McCOLLOUGH.